(12) United States Patent
Merlin et al.

(10) Patent No.: US 6,514,584 B1
(45) Date of Patent: Feb. 4, 2003

(54) SILICONE CONTAINING LAMINATE ADHESIVE

(75) Inventors: Patrick J. Merlin, Neufvilles (BE); Daniel Futter, Brussels (BE); John E. Wyman, Sanibel, FL (US); Imtiaz Rangwalla, Andover, MA (US); Gary Power, Melbourne (AU); Karen Branch, London (GB)

(73) Assignees: UCB Films PLC, Star House, Watford (GB); EG Technology Partners, L.P., Wilmington, MA (US); Dow Corning Corporation, Midland, MI (US)

( * ) Notice: Subject to any disclaimer, the term of this patent is extended or adjusted under 35 U.S.C. 154(b) by 0 days.

(21) Appl. No.: 09/341,255

(22) PCT Filed: Jan. 16, 1998

(86) PCT No.: PCT/BE98/00008

§ 371 (c)(1),
(2), (4) Date: Dec. 17, 1999

(87) PCT Pub. No.: WO98/31541

PCT Pub. Date: Jul. 23, 1998

(30) Foreign Application Priority Data

Jan. 17, 1997 (GB) ............................................. 9700905

(51) Int. Cl.[7] ............................................... B29D 22/00
(52) U.S. Cl. ................... 428/36.7; 156/273.7; 156/329; 528/26; 528/392
(58) Field of Search .............................. 156/329, 273.7; 428/36.7; 528/392, 26

(56) References Cited

U.S. PATENT DOCUMENTS

| | | | | |
|---|---|---|---|---|
| 2,721,873 A | * | 10/1955 | MacKenzie et al. | ......... 156/329 |
| 3,655,633 A | * | 4/1972 | Saam | ........................... 528/26 |
| 4,032,487 A | * | 6/1977 | Columbus | ................... 156/329 |
| 4,569,879 A | * | 2/1986 | Groves | ....................... 428/198 |
| 5,215,822 A | | 6/1993 | Wyman et al. | |
| 5,260,350 A | | 11/1993 | Wright | |
| 5,368,941 A | | 11/1994 | Blizzard et al. | |
| 5,374,483 A | | 12/1994 | Wright | |
| 5,434,007 A | | 7/1995 | Yeh | |

FOREIGN PATENT DOCUMENTS

| | | |
|---|---|---|
| EP | 0 424 007 A2 | 10/1990 |
| EP | 0 624 464 A1 | 11/1994 |
| EP | 0 666 290 A1 | 2/1995 |
| JP | 7-18221 | 1/1995 |

* cited by examiner

*Primary Examiner*—John J. Gallagher
(74) *Attorney, Agent, or Firm*—Richard I. Gearhart; Alan Zombeck

(57) ABSTRACT

The invention is a laminate structure made by coating at least one side of a substrate with a laminating adhesive, bringing a coated side of said substrate into contact with a second substrate to form a multi-layer film, and treating said multi-layer film with a free radical initiator, wherein said laminating adhesive is the reaction product of a multifunctional acrylate, an aminofunctional silane, and an ethylenically unsaturated acid, optionally dissolved in a solvent, wherein the multifunctional acrylate has a molecular weight of from 100 to 3000.

24 Claims, No Drawings

SILICONE CONTAINING LAMINATE ADHESIVE

FIELD OF THE INVENTION

The invention relates to silicone containing laminates having barrier properties which are useful in packaging applications.

BACKGROUND OF THE INVENTION

It is well known that coatings containing silane compounds and itaconic acid improve the gas, oil, and flavor barrier performance of organic polymer film substrates. Moreover, the adhesion of the coating to the film surface, as well as the improved barrier characteristics provided by the silane coating, are greatly enhanced by exposing the coated film to electron beam radiation.

A particularly useful barrier composition is described in U.S. Pat. No. 5,215,822, which teaches a methanol solution of a vinyl benzyl amine silane (Dow Corning Corp. Z-6032), itaconic acid, and water; coating this solution on a corona treated low density polyethylene film, drying, and then subjecting the coated film to electron beam radiation to graft the coating to the film surface and further improve the barrier properties of the silane coating. However, while this coating gives excellent gas barrier properties at low to moderate relative humidity values, the gas permeability increases drastically at very high relative humidity values. The present inventors have surprisingly discovered that the combination of an aminofunctional silane, a multifunctional acrylate and an ethylenically unsaturated acid gives excellent gas barrier properties at low to moderate relative humidity values, as well as excellent gas barrier properties at very high relative humidity values.

While other patents teach the combination of a mono or multifunctional acrylate with an aminofunctional silane, none teaches the addition of the ethylenically unsaturated acid with an acrylate. For example, U.S. Pat. No. 5,368,941 teaches a deformable, abrasion-resistant coating formulated from at least one multi-functional acrylate monomer, at least one aminofunctional silane, colloidal silica and at least one acrylate-terminated polyalkylene oxide, but does not teach the addition of an ethylenically unsaturated acid. The acrylate-terminated polyalkylene oxide helps prevent gelling of the coating composition during stripping and also imparts the composition with deformability, without sacrificing abrasion resistance. Also, U.S. Pat. No. 5,434,007 teaches a silane resin coated on a plastic film, where the silane resin is composed of a monofunctional acrylate and an aminofunctional silane. The composition does not utilize a free radical cure, nor does it incorporate the ethylenically unsaturated acid.

U.S. Pat. Nos. 5,260,350 and 5,374,483 relate to a silicone coating composition which, when cured on a solid substrate either by ultraviolet or electron beam radiation, provides a transparent abrasion resistant coating firmly adhered thereon. The silicone coating is prepared by reacting at least one multifunctional acrylate monomer with an aminoorganofunctional silane, mixing the modified silane with at least one acrylic monomer and thereafter adding colloidal silica. Again however, neither of these compositions teach the addition of an ethylenically unsaturated acid to achieve barrier properties.

JP (Kokai) publication 7-18221 published on Jan. 20, 1995 teaches a surface treatment composition for gas barrier comprising an aminosilane and a compound having an aromatic ring or hydrogenated ring. The present invention is distinguishable, however, because it does not require the addition of cyclic compounds having an aromatic ring.

The present invention is distinguishable from the prior art because none teach the addition of a polymerizable additive to achieve gas barrier properties, nor do they teach a composition having both barrier and adhesive characteristics.

SUMMARY OF THE INVENTION

The invention comprises a laminate structure made by the following method:

coating at least one side of a substrate with a laminating adhesive, bringing a coated side of said substrate into contact with a second substrate to form a multi-layer film, and curing said multi-layer film by initiating a free-radical reaction after the second substrate is contacted with the first substrate, wherein said laminating adhesive is the reaction product of a multifunctional acrylate, an amninofunctional silane, and an ethylenically unsaturated acid, optionally dissolved in a solvent, wherein the multifunctional acrylate has a molecular weight of from 100 to 3000, and the aminofunctional silane has at least one molecule of the formula

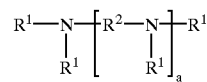

wherein $0 \leq a \leq 4$ $R^1$ is independently hydrogen, alkyl, substituted alkyl, aryl, substituted aryl, arylalkyl, acryl, methacryl, alkylaryl, $R^2\text{—SiR}_m(OR)_{3-m}$, or an alkylene linking group having 2 to 12 carbon atoms connected to one or two nitrogen atoms, with the proviso that at least one $R^1$ is a hydrogen atom and at least one $R^1$ is an $R^2\text{—SiR}_m(OR)_{3-m}$ group, where m is 0, 1 or 2, and R is independently a hydrogen or an all group having from 1 to 6 carbon atoms;

$R^2$ is independently selected from the group consisting of:
  linear or branched alkylene groups having from 1 to 12 carbon atoms;
  arylene groups having from 6 to 12 carbon atoms; and
  linear or branched hydrocarbon groups having from 1 to 16 carbon atoms and at least one alcohol, alcohol ether, ester, amide, urea, thiourea or polyether group.

The invention is a laminate, which can be made from a variety of substrates. The laminate can then be used alone or with other substrates to give structural or barrier properties to packaging containers. The laminate adhesive can be further cured by drying in the presence of water prior to exposure to electron beam irradiation.

A composition according to the present invention may be employed to provide a barrier layer which improves resistance of the material to transmission of gases and aromas therethrough. For example, a 30 μm uncoated biaxilly oriented, corona treated polypropylene film is generally found to have a permeability to oxygen of 1500 ml/m²/day as measured at ASTM D3985-81 measured at 80% relative humidity. With the present coatings, the oxygen transmission rate of the same film can be reduced to less than 250 ml/m²/day as measured at 80% relative humidity. As used herein, the terminology "improved barrier" refers to a coating which can reduce oxygen transmission rate of the aforementioned uncoated polypropylene film from 1500 ml/m²/day to 250 ml/m²/day as measured at ASTM D3985-81 measured at 80% relative humidity.

DESCRIPTION OF THE PREFERRED EMBODIMENTS

While the invention is susceptible of embodiment in many different forms there is described herein in detail preferred and alternate embodiments of the invention.

Aminofunctional Silanes

The aminofunctional silanes are described generally by the formula:

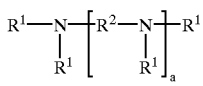

wherein $0 \leq a \leq 4$ $R^1$ is independently hydrogen, alkyl substituted alkyl, aryl, substituted aryl, arylalkyl, acryl, methacryl, alkylaryl, $R^2$—$SiR_m(OR)_{3-m}$, or an alkylene linking group having 2 to 12 carbon atoms connected to one or two nitrogen atoms, with the proviso that at least one $R^1$ is a hydrogen atom and at least one $R^1$ is an $R^2$—$SiR_m(OR)_{3-m}$ group, where m is 0, 1 or 2, and R is independently a hydrogen or an alkyl group having from 1 to 6 carbon atoms;

$R^2$ is independently selected from the group consisting of:
linear or branched alkylene groups having from 1 to 12 carbon atoms;
arylene groups having from 6 to 12 carbon atoms; and
linear or branched hydrocarbon groups having from 1 to 16 carbon atoms and at least one alcohol, alcohol ether, ester, amide, urea, thiourea or polyether group.

The most preferred aminofunctional silanes useful for the present invention are N-(2-aminoethyl)-3-aminopropyltrimethoxy silane. and aminopropyltriethoxysilane, and blends thereof.

For the purpose of the present invention, the above mentioned amine functional silane has the general formula

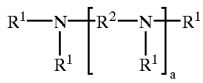

In the above formula, $R^1$ is a monovalent radical independently selected from the group consisting of hydrogen; acryl, methacryl, alkyl groups having 1 to 18 carbon atoms, such as methyl, ethyl, propyl, isobutyl, hexyl, octyl, decyl, dodecyl, and octadecyl; substituted alkyl having 1 to 18 carbon atoms, such as 3-chloropropyl and 3,3,3-trifluoropropyl; aryl having 6 to 16 carbon atoms, such as phenyl and naphthyl; substituted aryl having 6 to 30 carbon atoms, such as chlorophenyl, chlorotolyl and dichloroxylyl; arylalkyl having 7 to 9 carbon atoms, such as benzyl, phenethyl and 3-phenylpropyl; and alkylaryl having 7 to 16 carbon atoms, such as tolyl, xylyl, ethylphenyl and propyltolyl. According to the invention, at least one $R^1$ group is hydrogen. Further, at least one $R^1$ is an $R^2$—$SiR_m(OR)_{3-m}$ group, where R is an alkyl group having from 1 to 6 carbon atoms, m is 0, 1, or 2 and $R^2$ is defined below. The remaining $R^1$ groups on the aminosilane are preferably hydrogen or methyl. $R^1$ can also be an alkylene linking group which links two different nitrogen atoms on the same molecule together, thus forming a cyclic aminosilane. The alkylene linking group can also be an arylene group which is connected to two different bonding sites on the same nitrogen atom. The alkylene linking group will have at least 2 carbon atoms and as many as 12 carbon atoms.

$R^2$ is an organic connecting group which provides a separation of at least one carbon atom between the nitrogen atoms or the nitrogen and silicon atoms. Thus, $R^2$ can be an alkylene group having at least 1 carbon atom or an arylene group having at least 6 carbon atoms. Preferably, $R^2$ is selected from the group consisting of ethylene, propylene, butylene, isobutylene, trimethylene, trimethylene, and hexaethylene.

In addition, $R^2$ can contain polar groups such as, linear or branched hydrocarbon groups having from 1 to 16 carbon atoms and at least one alcohol, alcohol ether, ester, amide, urea, thiourea or polyether group. Specific examples of such groups include, those having the general formula —CH$_2$CH(OH)(CH$_2$)$_x$—, —CH$_2$CH(OH)(CH$_2$)$_x$—O—(CH$_2$)$_y$—, —CH$_2$CH(CH$_3$)C(=O)—O—(CH$_2$)$_y$—, —CH$_2$CH$_2$C(=O)—O—(CH$_2$)$_y$—, —CH$_2$CH$_2$C(=O)—N(R)—(CH$_2$)$_y$—, —C(=O)—N(R)—(CH$_2$)$_y$—, —C(=S)—N(R)—(CH$_2$)$_y$—, or where x and y are each integers from 1 to 12. The hydroxyl and ester groups are highly polar, and it is believed the polar nature of the groups improve barrier properties.

Examples of specific amine-containing groups include such structures as —CH$_2$CH$_2$CH$_2$NH$_2$, —CH$_2$CH$_2$CH$_2$N(H)CH$_2$CH$_2$NH$_2$, —CH$_2$CH$_2$CH$_2$N(H)CH$_2$CH$_2$N(H)CH$_2$CH$_2$NH$_2$, —CH$_2$CH$_2$CH$_2$CH$_2$NH$_2$, —CH$_2$CH$_2$CH$_2$CH$_2$CH$_2$NH$_2$, —CH$_2$CH$_2$CH$_2$N(H)Me, —CH$_2$CH$_2$CH$_2$N(H)CH$_2$CH$_2$NMe$_2$, —CH$_2$CH$_2$CH$_2$N(H)Et, —CH$_2$CH$_2$CH$_2$N(Et)H, —CH$_2$CH(CH$_3$)CH$_2$N(H)CH$_2$CH$_2$NH$_2$ and —CH$_2$CH(CH$_3$)CH$_2$NH$_2$, inter alia, wherein Me and Et denote methyl and ethyl, respectively. A specific example of an amine containing cyclic group is piperazine.

As used herein the term "aminofunctional silane" can mean a single species of the formula described above, such as N-(2-aminoethyl-3-aminopropyltrimethoxy silane, or it can mean mixtures or one or more species of aminofunctional silanes, such as N-(2-aminoethyl)-3-aminopropyltrimethoxy silane and aminopropyltriethoxysilane.

The above described amninofunctional silanes can be prepared by methods known to those skilled in the art, and which are amply described in the chemical literature.

Multifunctional Acrylates

The multifunctional acrylates of the present invention are defined as acrylates having, on average, greater than two functional acrylate groups per molecule and a molecular weight of from about 100 to about 3000. Multifunctional acrylates are preferred over monofunctional acrylates because monofunctional acrylates do not form flexible, crack free coatings as do the multifunctional acrylates. The majority of multifunctional acrylates commercially available can be used, but it is the smaller, more compact, i.e., proportionally more reactive acrylates that give the best results. The multifunctional acrylates are preferably selected from the group consisting of acrylated polyols with molecular weights of from about 150 to about 600; polyester urethane acrylates with molecular weights of from about 1000 to about 2000; polyether acrylates with molecular weights from 200 to 1500; polyurethane acrylates with molecular weights of from about 400 to about 2000; polyurea acrylates with molecular weights of from about 400 to about 2000; epoxy acrylates with molecular weights of from about 300 to about 1000; and mixtures of multifunctional acrylates thereof.

Most preferred acrylates are pentaerythritol tetracrylate; an acid functional acrylate; polyester tetra acrylate; polyether tetra acrylate; an aliphatic urethane acrylate, Ebecryl 1290; ditrimethylolpropane tetra acrylate; an ethoxylated trimethylol propane triacrylate, Ebecryl 160. Other preferred acrylate include glycerol triacrylate, triacrylate ester of tris-[z-hydroxy-ethyl] isocyanurate, hexane dioldiacrylate, and dipentaerythritol hexacrylate. Ethoxylated and propoxylated versions of these acrylates may be used in this invention. These acrylates and methods of their production are well know in the art, and available commercially from such companies as UCB Radcure, (Brussels, Belgium) and Sartomer Corp. (Philadelphia, Pa.) As used herein, the term "mixtures of multifunctional acrylates" means mixtures of different acrylates of the same species, such as two different epoxy acrylates, or mixtures of different species of acrylates, such as epoxy acrylates and urethane acrylates.

Ethylenically Unsaturated Acid

In addition to the aminosilane and the multifunctional acrylate, a quantity of an ethylenically unsaturated acid is added to the composition. By "ethylenically unsaturated acid" it is meant any acid which has vinyl unsaturation. It is believed that the ethylenically unsaturated acid substantially improves the oxygen barrier performance of the compositon because the carboxylic group forms an amine salt with amino groups of the aminosilane, which contributes significantly to the coating's barrier properties. The ethylenically unsaturated acid is likely to be added in the amount of at least 5 to about 60 parts by weight of the composition, with about 30 to about 50 parts by weight being most preferred. The most preferred ethylenically unsaturated acids used in the present invention are dicarboxylic (i.e. have two carboxylic acid groups) and the most preferred is itaconic acid: however, other acids such as fumaric, maleic, citraconic, methacrylic, cinnamic, vinyl sulfonic acid, mesaconic acid, and itaconic acid monomethylester may also be used. The term "ethylenically unsaturated acid" as used herein includes mixtures of one or more of the aforementioned acids.

Solvents

The components of the present invention can optionally be reacted together in a solvent. In general, water, alcohols and blends thereof will serve as suitable solvents because the multifunctional acrylate and the ethylenically unsaturated acid are soluble therein. Typically, the solvent is a water/alcohol mixture where the alcohol is present in an amount of about 1–99%. In addition, the selected solvent must wet the substrate. Preferably, the solvent will be nontoxic, and will not extend the drying time of the coating beyond what is commercially acceptable. The amount of solvent can range from about 20 to about 99 parts by weight and is preferably from about 60 to about 95 parts by weight of the total composition. Preferred solvents are methanol, ethanol, n-propanol, isopropanol, butanol, and 1-methoxy-2-propanol (available as "Dowanol PM" from the Dow Chemical Co., Midland, Mich.).

Critical Ratios

During the reaction of aminosilanes with multifunctional acrylates, it is possible to utilize an excess of multifunctional acrylate over and above that required to react with the amino nitrogen atoms. In multifunctional acrylates, such as pentaerythritol tetraacrylate, the amine chains attached to the trimethoxysilyl groups may also have pendent acrylate groups which will undergo further polymerization under the influence of ionizing radiation. It is believed that the acrylate groups of the multifunctional acrylate and the amino groups of the aminofunctional silane undergo an addition reaction (Michael Addition) readily upon mixing of these two components. In addition, hydroxyl groups and solvents present may interact with alkoxy groups attached to the silicone atoms of the aminofunctional silane and cause a thickening of the composition at certain concentrations of the components in the solvent. For example, one may employ an "amine rich" system, in which the total number of amine functional sites in the composition due to the aminofunctional silane can be up to about six (6) times greater than the total number of acrylate sites in the composition due to the multifunctional acrylate, i.e., the ratio of amine functionality to the acrylate functionality can be from about 6:1 to about 1:1, with a ratio of about 4:1 to about 1:1 being preferred, and with a ratio of 2:1 being most preferred. In the case where the aminofunctional silane is N-(2-aminoethyl)-3-aminopropyltrimethoxy silane or aminopropyltriethoxy silane, and the multifunctional acrylate is pentaerythritol tetraacrylate, the ratios in the amine rich system can be expressed in terms of molar ratios, with the preferred molar ratio of aminosilane to multifunctional acrylate being from about 6:1 to about 1:1 with a molar ratio of about 4:1 being most preferred.

Excellent results can also be achieved using an "acrylate rich" system, where the total number of reactive nitrogen sites in the composition from the aminofunctional silane is up to about six (6) times less than the total number of reactive acrylate sites in the composition due to the multifunctional acrylate, i.e., the ratio of amine functionality to acrylate functionality, can be from about 1:1 to about 1:6. with a range of about 1:3 being preferred. In the case where the aminofunctional silane is N-(2-aminoethyl)-3-aminopropyltrimethoxy silane or aminopropyltriethoxysilane, and multifunctional acrylate is pentaerythritol tetraacrylate, the ratios of the acrylate rich system can be expressed in terms of molar ratios, with the preferred molar ratio of aminosilane to multifunctional acrylate being from about 1:1 to about 1:3, with a molar ratio of about 1:1.5 being most preferred.

Although the order of addition of the components to provide a composition according to the present invention is not critical, certain methods are preferable. For example, the aminofunctional silane and the acrylate component can be added together to form a Michael Adduct, before the addition of the ethylenically unsaturated acid. Also, the ethylenically unsaturated acid may be added at some point after the Michael Addition reaction begins, but before the aminosilane and/or the acrylate are completely consumed. "Quenching" the reaction by adding the ethylenically unsaturated acid can occur at any point in the reaction process, i.e., the acid may be added to the aminosilane before any acrylate is added, or after most of the acrylate is added. Practically, the reaction may be quenched at a predetermined point by simply adding part of the acrylate to the aminosilane, then adding the rest of the acrylate and the acid to this mixture. It is preferred that the quenching technique be used with the amine rich formulations of the invention.

The key factor in determining whether a particular formulation is acceptable as a laminate adhesive is whether the composition exhibits a minimum degree of tackiness. If the laminate adhesive is at least minimally tacky, then it will fall within the scope of the invention. The tackiness can be achieve by optimizing the ratios of the components as described above, or by adding a tackifier, such as multifunctional acyrlates.

Coat Weight

The coating can be applied in any desired amount, however, it is preferred that the coating be applied in an amount of from about 0.05 to about 20 g/m$^2$, the preferred coating weight being from about 0.5 to about 10 g/m$^2$. Coating weight can be determined by gravimetric comparison. The coating can be applied to the substrate by any conventional method, such as spray coating, roll coating, slot coating, meniscus coating, immersion coating, and direct, offset, and reverse gravure coating.

Substrates

The coating can be disposed on a wide variety of substrates, including, but not limited to polyolefins, such as oriented polypropylene (OPP), cast polypropylene, polyethylene and polyethylene copolymers, polystyrene, polyesters, such as polyester terephthalate (PET), or polyethylene naphthalate (PEN), polyolefin copolymers, such as ethylene vinyl acetate, ethylene acrylic acid and ethylene vinyl alcohol (EVOH), polyvinylalcohol and copolymers thereof, polyamides, such as nylon, and MXD6, polyimides, polyacrylonitrile, polyvinylchloride, polyvinyl dichloride, polyvinylidene chloride, and polyacrylates, ionomers, polysaccharides, such as regenerated cellulose, and silicone, such as rubbers or sealants, other natural or synthetic rubbers, glassine or clay coated paper, paper board or craft paper, and metallized polymer films and vapor deposited metal oxide coated polymer films, such as AlO$_x$, SiO$_x$, or TiO$_x$.

The aforesaid substrates are likely to be in the form of a film or sheet, though this is not obligatory. The substrate may be a copolymer, a laminate, a coextruded, a blend, a coating or a combination of any of the substrates listed above according to the compatibility of the materials with each other. In addition, the substrate may be in the form of a rigid container made from materials such as polyethylene, polypropylene, polystyrene, polyamides, PET, EVOH, or laminates containing such materials.

The aforesaid substrates may also be pretreated prior to coating by corona treatment, plasma treatment, acid treatments and flame treatments, all of which are known in the art.

In addition, the compositions of the present invention can be used in a wide variety of packaging containers, such as pouches, tubes, bottles, vials, bag-in-boxes, stand-up pouches, gable top cartons, thermoformed trays, brickpacks, boxes, cigarette packs and the like. Of course, the present invention is not limited to just packaging applications, and may be used in any application wherein gas, or aroma barrier properties are desired, such as tires, buoyancy aides, inflatable devices generally, etc.

Any of the foregoing substrates may have primers applied thereon. The primers are applied to the substrates by methods known in the art such as spray coating, roll coating, slot coating, meniscus coating, immersion coating, and direct, offset and reverse gravure coating. Suitable primers include, but are not limited to carbodiimide, polyethylenimine, and silanes, such as N-(2-aminoethyl)-3-aminopropyltrimethoxy silane and aminopropyltriethoxysilane.

The most preferred laminate structures are (where Si represents the coating composition of this invention), OPP/Si/OPP, OPP/Si/PE, metOPP/Si/OPP, metOPP/Si/PET, metal oxide coated PET/Si/PE, metal oxide coated OPP/Si/PE, metal oxide coated PET/Si/PP, metal oxide coated OPP/Si/PP, and PE/Si/PE.

Curing

While the compositions of the present invention will form films at ambient conditions, optimum results are achieved by heating and/or free radical cures of the laminate structure. For example, the first substrate may be exposed to heat and/or moisture prior to lamination of the second substrate. Generally, the higher the temperature, the faster the coating will dry. The upper limit to the heating temperature is the temperature at which the substrate will undergo unacceptable distortion. Also, temperature will accelerate the rate of hydrolysis of silicon/alkoxy groups and also the rate of condensation of the silicon/alkoxy groups with silicon/hydroxy groups to form silicon-oxygen-silicon groups. The composition may be heated at room temperature or in an oven at temperatures up to about 140° C., with temperatures of from about 60° C. to about 120° C. being preferred and temperatures of about 90° C. to about 110° C. being most preferred. Heating time is temperature dependent and the coating will reach tack free time in one to 10 seconds. The heating step serves to evaporate the solvent and accelerate the condensation reaction between Si—OH groups and SiOH/SiOH groups. The compositions may be further cured by initiating a free radical reaction after the second substrate is contacted with the first substrate. The most preferred method of initiating the free radical reaction is through the use of electron beam radiation, although ultraviolet or free radical generators such as azo compounds and peroxides may also be used.

The compositions are preferably cured by a free radical generator, such as ultraviolet, electron beam, or gamma radiation or chemical free radical generators such as azo compounds and peroxides. Low energy electron beam is the preferred method of curing because it is cheaper than gamma sources like Cobalt M-60. Its advantage over ultraviolet radiation as a cure system lies in its ability to generate free radicals without photoinitiators. It also imparts higher yields of crosslink density and chemical grafting of the coating to the substrate. Electron beam accelerators of various types such as van de Graaf-type, resonance transformer-type, linear-type, dynamatron-type and high frequency-type can be used as a source of electron beam. Electron beam having energy of from about 5 to about 2000 KeV, preferably from about 50 to about 300 KeV discharged therefrom may be irradiated in a dose of from about 0.1 to about 10 Mrads (MR). Low electron beam voltages Tess than 20 KeV) may be used if the substrate is treated in a vacuum. Commercially available sources of electron beam are Electro Curtain CB-150 available from Energy Sciences, Inc. (Wilmington, Mass.). The compositions may also be ultraviolet light cured if one or more photoinitiators is added prior to curing. There are no special restrictions on the photoinitiators as long as they can generate radicals by the absorption of optical energy. Ultraviolet light sensitive photoinitiators or blends of initiators used in the UV cure of the present composition include 2-hydroxy-2-methyl-1-phenyl-propan-1-one (Darocure 1173), sold by EM Chemicals, and 2,2 Dimethoxy-2-phenyl-acetol-phenone (Urgacure 651), sold by Ciba-Geigy Corporation, Hawthorne, N.Y. For purposes of this invention, it has been found that from about 0.05 to about 5 weight percent based on the total solids in the composition, of the photoinitiators described therein will cause the composition to cure.

In addition to radical polymerization and grafting to crosslink the coating after it has been applied to the film substrate, it is possible to further crosslink the amine silane materials utilizing acid catalyzed condensation reactions. In this reaction, a methoxylated active hydrogen compound, such as trimethylol phenol, or a mixture of formaldehyde with aldehydes, ketones, and other active hydrogen compounds react with amine salts, such as the itaconate salts of the amine silanes or derivatives to form alkylated amines.

Preferred Embodiments

To prepare the preferred embodiment of the invention, the acrylate component, preferably PETA, is dissolved in a solvent such as Dowanol PM. Itaconic acid, in an amount of 10.4 moles is then added to the equilibrated solution. The silane, preferably N-(2-amino ethyl) gamma aminopropyl trimethoxysilane is added to the above solution so the molar ratio of aminosilane to acrylate is about 4:1. This mixture is allowed to equilibrate for one hour at ambient conditions. The coating solution is applied to corona treated 30 μm thick "Rayopp" oriented polypropylene film available from UCB Films Corporation. The coated film is placed immediately in an oven maintained at about 80–1000° C. and held there for 1–10 seconds. The oven is maintained at a relative humidity of about 50%. A second substrate, such as metalized oriented polypropylene film is place on the laminate adhesive, then the laminate structure is "cured" by an electron beam dose of 10 Megarads at 170 kV.

Optional Additives

Various optional additives can be added to the composition to improve various properties. These additives may be added as desired and in any amount as long as they do not degrade the performance of the barrier coatings as illustrated herein. Examples of additives include additional additives as earlier described, antiblock and slip aides such as stearamide oleamide or polar additives, such as epoxides, polyols, glycidols or polyamines, such as polyethylenimine, and other silanes such as N-(2-aminoethyl)-3-aminopropyltrimethoxy silane and aminopropyltriethoxysilane may also be added. Specifically excluded from the scope of the present invention are colloidal silicas and silanes or other molecules having four alkoxy or other hydrolyzable groups disposed on a single silicone or other organometalic atom, such as tetra ethoxy silane, and the like. Wetting agents, such as a polyethoxylated alkyl phenyol may also be added.

Examples

The experiments below illustrate the utility of a mixture of itaconic acid with the Michael addition product of various acrylate esters with N-(2-amino ethyl)gamma aminopropyl trimethoxysilane, hereinafter referred to as Z-6020, as a gas barrier coating on polypropylene film for use as a laminate adhesive. In experiments 1–3 the Z-6020, acrylate ester, and itaconic acid were utilized in a total solids content of 34 grams/104 grams of solution. The solvent employed in all the experiments described below was 1-methoxy-2-propanol, available commercially from Dow Chemical Company (Midland, Mich.) as "Dowanol PM". The Z-6020 was obtained from Dow Corning Corporation (Midland, Mich.) and the itaconic acid from Aldrich Chemical Company (Milwaukee, Wis.). The coating solutions were all applied to corona treated 30 μm thick "Rayopp" oriented polypropylene film from UCB Films Corporation utilizing a #12 Myer rod. The coated film was placed immediately in a laboratory oven maintained at 80–100° C. and held there for 10 minutes. Two open pans of water placed on the bottom shelf of the oven maintained a relative humidity of about 50%.

The oxygen permeability values for each film are given in units of ml/square meter per 24 hours, "dry" values measured at 0% relative humidity using a MOCON Oxtran Model 100 and "wet" values at 80–82% relative humidity utilizing a MOCON Model 2/20 MH. The MOCON instruments were obtained from Modem Controls Corporation. For comparison, the polypropylene base film had a permeability of about 1500 ml/square meter 24 hours. Solutions were coated with a RK coater and let 10 minutes to dry at room temperature; laminates are then prepared by applying a second film on the coated one with a roller. The resulting laminates are then cured by EB at 170 kV, 10 Mrads or by UV (dose=11 mJ/cm$^2$). Solutions were coated with a green K-bar that gives a coatweight of 4–4.5 gsm in the same conditions (30% solids in IPA). In Table 1 below, each the molar ratios of compositions and methods of preparation are shown.

TABLE 1

| | Preparation |
|---|---|
| Z6020/PETA/ITA (4:1:10.4), quenched: | 13.52 g ITA and 3.52 g PETA were mixed in 60.48 g IPA. 8.88 g Z-6020 were then added. |
| Z-6020/PETA/ITA (4:1:10.4), semi-quenched: | 3.52 g PETA are dissolved in 60.48 g IPA. 0.555 g Z-6020 are then added. 13.52 g ITA are added to the resulting solution, before the remaining Z-6020 (1.665 g). |
| Z-6020/PETA/ITA (1:1.5:2.6): | 5.28 g PETA are dissolved in 25.39 g IPA. 2.22 g Z-6020 are then added. The products are allowed to react for 20 minutes before adding 3.38 g ITA. |
| A-1100/PETA/ITA (1:1.5:2.6): | 5.28 g PETA are dissolved in 25.39 g IPA. 1.8 g A-1100 are then added. The products are allowed to react for 20 minutes before adding 3.38 g ITA. |
| Z-6020/SR-415/ITA (1:1.5:2.6): | 17.64 g SR-415 are dissolved in 25.39 g IPA. 2.22 g Z-6020 are then added. The products are allowed to react for 20 minutes before adding 3.38 g ITA. |
| Z-6020/EB5129/ITA (1:1.5:2.6): | 2.5 g EB-5129 are dissolved in 25.39 g IPA. 2.22 g Z-6020 are then added. The products are allowed to react for 20 minutes before adding 3.38 g ITA. |
| Z-6020/PETA/acrylic acid, quenched: | 7.49 g acrylic acid and 3.52 g PETA were mixed in 60.48 g IPA. 8.88 g Z-6020 were then added. |

These solutions were formed into laminate structures of various configurations, as described below in Table 2. In Table 1, OPP is corona treated 30 μm thick "Rayopp" oriented polypropylene film from UCB Films Corporation, metOPP is 30 μm metalized oriented polypropylene also available from UCB Films Corporation, PE is a 50 μm low density polyethylene film made by Dow Corning Corp. having a density of 0.92 and a 2 melt index. The OPET is 12 μm oriented polyethylene terephthalate, available as Ceramis CTXD from Lawson Martin and the OPPSiOx is 20 μm oriented polypropylene with SiOx, available as Ceramis CO, also from Lawson Martin. EB 5129 is a hexafunctional urethane acrylate available from UCB Chemicals. SR-415 is an ethoxylated triacrylate from Sartomer and A-1100 is an aminoalkyl ethoxysilane form Union Carbide Corp.

TABLE 2

| Formulation | Substrate | Cure | Dry OTR (ml/m² day) | Wet OTR (ml/m² day) | Observations Adhesion* |
|---|---|---|---|---|---|
| Z-6020/PETA/ITA (4:1:10.4), quenched | OPP/OPP | EB | 9.0 | 188 | + |
| | OPP/OPP | UV | Not meas. | 190 | − |
| | OPP/metOPP | EB | 0.35 | 0.18 | + |
| | OPP/metOPP | UV | Not meas. | 38 | + |
| | OPP/PE | EB | 4.6 | 48 | + |
| | PE/PE | EB | 30 | 35 | + |
| | OPETSiOx/PE | EB | 0.05 | 0.03 | + |
| | OPPSiOx/OPP | EB | 0.2 | 0.82 | + |
| | OPP/OPET | EB | 10 | 45.6 | + |
| Z-6020/PETA/ITA 4:1:10.4, semi-quenched | OPP/OPP | EB | 3.5 | 201 | + |
| Z-6020/PETA/ITA 1:1.5:2.6 | OPP/OPP | UV | Not meas. | 50 | + |
| Z-6020/PETA/ITA 1:1.5:2.6 | OPP/OPP | EB | 70 | 247.3 | + |
| A-1100/PETA/ITA (1:1.5:2.6) | OPP/OPP | EB | 59.5 | 79.3 | + |
| Z-6020/EB5129/ITA (1:1.5:2.6) | OPP/OPP | EB | <1 | 222 | + |
| Z-6020/PETA/acrylic acid, quenched | OPP/OPP | EB | Not meas. | 485.6 | + |

*"+" indicates excellent adhesion between laminates: "−" indicates poor adhesion.

What is claimed is:

1. A method of manufacturing a laminate having barrier properties comprising:
   (I) coating at least one side of a substrate with a laminating adhesive,
   (II) bringing a coated side of said substrate into contact with a second substrate to form a multi-layer film, and
   (III) treating said multi-layer film with a free radical initiator, wherein said laminating adhesive is the reaction product of a tri or higher functional acrylate, an aminofunctional silane, and an ethylenically unsaturated dicarboxylic acid or a monoalkylester thereof, optionally dissolved in a solvent, wherein the tri or higher functional acrylate has a molecular weight of from 100 to 3000, and the aminofunctional silane has the formula

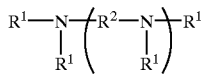

wherein
   $0 \leq a \geq 4$
   $R^1$ is independently hydrogen, alkyl, substituted alkyl, aryl, substituted aryl, arylalkyl, acryl, methacryl, alkylaryl, $R^2$—$SiR_m(OR)_{3-m}$, or $R^1$ is an alkylene linking group having 2 to 12 carbon atoms connected to one or two nitrogen atoms, with the proviso that at least one $R^1$ is a hydrogen atom and at least one $R^1$ is an $R^2$—$SiR_m(OR)_{3-m}$ group, where m is 0, 1 or 2, and R is independently an alkyl group having from 1 to 6 carbon atoms;

$R^2$ is independently selected from the group consisting of: linear or branched alkylene groups having from 1 to 12 carbon atoms; arylene groups having from 6 to 12 carbon atoms; and linear or branched hydrocarbon groups having from 1 to 16 carbon atoms and at least one alcohol, alcohol ether, ester, amide, urea, thiourea or polyether group.

2. The Method according to claim 1 wherein the aminofunctional silane is N-(2-aminoethyl)-3-aminopropyltrimethoxysilane or aminopropyltriethoxy silane, or mixtures thereof.

3. The method according to claim 1, wherein the molar ratio of the aminofunctional silane to the multifunctional acrylate is from 6 to 1:1.

4. The method according to claim 3, wherein the molar ratio of the aminofunctional silane to the multifunctional acrylate is 4:1.

5. The method according to claim 1, wherein the multifunctional acrylate is selected from:
   acrylated polyols with molecular weights from 150 to 600;
   polyester acrylates with molecular weights from 1000 to 2000;
   polyester acrylates with molecular weights from 200 to 1500;
   polyester urethane acrylates with molecular weights from 400 to 2000;
   polyurea acrylates with molecular weights from 400 to 2000;
   epoxy acrylates with molecular weights from 300 to 1000; and
   mixtures of multifunctional acrylates.

6. The method according to claim 5, wherein the multifunctional acrylate is selected from: pentaerythritol tetraacrylate, ditrimethylolpropane tetraacrylate, trimethylolpropane triacrylate, glycerol triacrylate, triacrylate ester of tris-[2-hydrocy-ethyl] isocyanurate, hexane diol diacrylate, and dipenta erythritol hexacrylate, and ethoxylated and propoxylated derivatives of the above.

7. The method according to claim 1, wherein the reaction product is dissolved in a solvent and the solvent is a water/alcohol mixture and the solvent constitutes 60–95 parts by weight of the total composition.

8. The method according to claim 1, wherein the molar ratio of the ethylenically unsaturated acid to the aminofunctional groups of the silane is from 1:1 or greater.

9. The method according to claim 1, wherein the ethylenically unsaturated acid is selected from itaconic acid, fumaric acid, maleic acid, citraconic acid, methacrylic acid, acrylic acid, sorbic acid, cinnamic acid, vinyl sulfonic acid, mesaconic acid, itaconic acid monomethylester, and mixtures thereof.

10. The method according to claim 1, wherein the aminofunctional silane is N-(2-aminoethyl)-3-aminopropyltrimethoxysilane or aminopropyltriethoxy silane, the ethylenically unsaturated acid is itaconic acid, and the multifunctional acrylate is pentaerythritol tetraacrylate.

11. The method according to claim 1, wherein the laminating adhesive includes an additive.

12. The method according to claim 11, wherein said additive is selected from a silane, polyethylenimine, glycidyl methacrylate, glycidol, ethylene glycol diglycol ether, bisphenol A, polyethoxylated phenol.

13. The method according to claim 1, wherein the free radical initiator of step (III) is provided by electron beam radiation, gamma radiation or ultraviolet radiation, optionally in the presence of photoinitiators.

14. The method according to claim 1 wherein the free radical initiator of step (III) is provided by heating said multi layer film in the presence of a free radical generator.

15. The method according to claim 13, wherein said electron beam radiation treatment of step (III) is performed at from 50 KeV to 10 MeV and greater than 2.5 Mrads.

16. The method according to claim 15, wherein said electron beam radiation treatment is performed at 150 kV and at least 5 Mrads.

17. The method according to claim 1, wherein the coated substrate is exposed to moisture.

18. The method according to claim 17, wherein the coated substrate is heated in the presence of moisture.

19. The method according to claim 1, wherein the substrate is selected from polyolefins, including oriented polypropylene (OPP), cast polypropylene, polyethylene and polyethylene copolymer; polystyrene; polyesters, including polyethylene terephthalate (PET), or polyethylene naphthalate (PEN); polyolefin copolymers, including ethylene vinyl acetate, ethylene acrylic acid and ethylene vinyl alcohol (EVOH), polyvinylalcohol and copolymers thereof; polyamides, including nylon, and MXD6; polyimides; polyacrylonitrile; polyvinylchloride; polyvinyl dichloride; polyvinylidence chloride; polyacrylates; ionomers; polysaccharides, including regenerated cellulose; silicone, including rubbers or sealants; natural or synthetic rubbers; glassine or clay coated paper; paper board; Kraft paper; and metallized films and vapor deposited metal oxide coated polymer films, including $AlO_x mSiO_x$, or $TiO_x$.

20. The method according to claim 1, wherein the second substrate used to form the laminate is selected from polyolefins, including oriented polypropylene (OPP), cast polypropylene, polyethylene and polyethylene copolymer; polystyrene; polyesters, including polyethylene terephthalate (PET), or polyethylene naphthalate (PEN); polyolefin copolymers, including ethylene vinyl acetate, ethylene acrylic acid and ethylene vinyl alcohol (EVOH), polyvinylalcohol and copolymers thereof; polyamides, including nylon, and MXD6; polyimides; polyacrylonitrile; polyvinylchloride; polyvinyl dichloride; polyvinylidene chloride; polyacrylates; ionomers; polysaccharides, including regenerated cellulose; silicone, including rubbers or sealants; natural or synthetic rubbers; glassine or clay coated paper; paper board; Kraft paper; and metallized films and vapor deposited metal oxide coated polymer films, including $AlO_x$, $SiO_x$, or $TiO_x$.

21. The method according to claim 1, wherein at least one of the substrates is treated with a primer.

22. The method according to claim 21, wherein the primer or primers are independently selected from a silane, polyethylenimine, and carbodiimide.

23. A packaging container comprising a laminate film integral therewith, wherein the laminate is formed by the method of claim 1.

24. The packaging container according to claim 23 wherein the package is selected from the group consisting of a pouch, tube, vial, bottle, bag-in-box, stand-up pouch, gable top carton, thermoformed tray, brick-pack, box, and cigarette pack.

* * * * *